United States Patent
Martensson et al.

(10) Patent No.: US 9,702,493 B2
(45) Date of Patent: Jul. 11, 2017

(54) KIT OF PARTS FOR ASSEMBLING A HOSE CONNECTION, A FUEL DISPENSING UNIT HAVING SUCH A HOSE CONNECTION, AND A METHOD FOR ASSEMBLING SUCH A HOSE CONNECTION

(75) Inventors: Mattias G. Martensson, Kavlinge (SE); Lars Andersson, Malmo (SE); James Dirocco, Jr., Hutto, TX (US)

(73) Assignee: Wayne Fueling Systems Sweden AB, Malmo (SE)

( * ) Notice: Subject to any disclaimer, the term of this patent is extended or adjusted under 35 U.S.C. 154(b) by 292 days.

(21) Appl. No.: 13/809,403

(22) PCT Filed: Jul. 9, 2010

(86) PCT No.: PCT/EP2010/059923
§ 371 (c)(1), (2), (4) Date: Jan. 9, 2013

(87) PCT Pub. No.: WO2012/003885
PCT Pub. Date: Jan. 12, 2012

(65) Prior Publication Data
US 2013/0113203 A1    May 9, 2013

(51) Int. Cl.
*F16L 41/00*    (2006.01)
*B67D 7/04*    (2010.01)
(Continued)

(52) U.S. Cl.
CPC ............... *F16L 41/00* (2013.01); *B67D 7/04* (2013.01); *B67D 7/38* (2013.01); *B67D 7/40* (2013.01);
(Continued)

(58) Field of Classification Search
CPC .... B67D 2007/0426; B67D 2007/0425; B67D 7/38; B67D 7/40; F16L 41/03
(Continued)

(56) References Cited

U.S. PATENT DOCUMENTS 2,460,622 A * 2/1949 Crawley .................... 285/130.1
3,506,029 A * 4/1970 Demler, Sr. et al. .... 285/133.21
(Continued)

FOREIGN PATENT DOCUMENTS

DE    102008055994 B4 * 9/2010
EP    0 407 110 A1    1/1991
(Continued)

OTHER PUBLICATIONS

PCT, International Preliminary Report on Patentability, International Application No. PCT/EP2010/059923; International Filing Date: Jul. 9, 2010, 19 pages.

*Primary Examiner* — David E Bochna
(74) *Attorney, Agent, or Firm* — Lisa Adams

(57) ABSTRACT

Kits of parts for assembling a hose connection, fuel dispensing units having such a hose connection, and methods for assembling such a hose connection are provided. In one embodiment, a kit of parts is provided that includes a plurality of hose connection parts selectable from, first hose connection parts including one fluid inlet and one fluid outlet, second hose connection parts including two fluid inlets and one fluid outlet, and third hose connection parts including three fluid inlets and one fluid outlet, which kit of parts is suitable for assembly of a hose connection having at least a first and second fluid inlet and a fluid outlet, according to any one of three configurations.

15 Claims, 3 Drawing Sheets

(51) Int. Cl.
*B67D 7/38* (2010.01)
*B67D 7/40* (2010.01)
*B67D 7/42* (2010.01)
*B67D 7/74* (2010.01)
*F16L 41/03* (2006.01)

(52) U.S. Cl.
CPC ............... *B67D 7/423* (2013.01); *B67D 7/74* (2013.01); *F16L 41/03* (2013.01); *B67D 2007/746* (2013.01); *Y10T 137/0447* (2015.04)

(58) Field of Classification Search
USPC ............... 285/125.1, 130.1, 12; 141/45, 285
See application file for complete search history.

(56) References Cited

U.S. PATENT DOCUMENTS

| | | | |
|---|---|---|---|
| 3,526,419 A * | 9/1970 | Nobuyoshi | 285/125.1 |
| 4,090,539 A * | 5/1978 | Krupp | 141/290 |
| 4,576,312 A * | 3/1986 | Swick, Jr. | 222/27 |
| 4,649,970 A * | 3/1987 | Bower et al. | 141/45 |
| 4,938,251 A * | 7/1990 | Furrow et al. | 285/12 |
| 5,203,384 A | 4/1993 | Hansen | |
| 5,908,055 A * | 6/1999 | Baumann et al. | 141/59 |
| 6,085,775 A * | 7/2000 | Smith | 137/269 |
| 6,547,159 B1 * | 4/2003 | Westby | 285/148.18 |
| 6,568,713 B1 * | 5/2003 | Bruvry et al. | 285/133.21 |
| 6,622,757 B2 * | 9/2003 | Hart et al. | 141/45 |
| 7,726,698 B2 * | 6/2010 | Larsson et al. | 285/125.1 |
| 8,333,410 B2 * | 12/2012 | Boticki | 285/130.1 |
| 2008/0276998 A1 * | 11/2008 | Boyher et al. | 137/561 A |

FOREIGN PATENT DOCUMENTS

| | | |
|---|---|---|
| EP | 1125888 A1 | 8/2001 |
| EP | 2196717 A1 | 6/2010 |

* cited by examiner

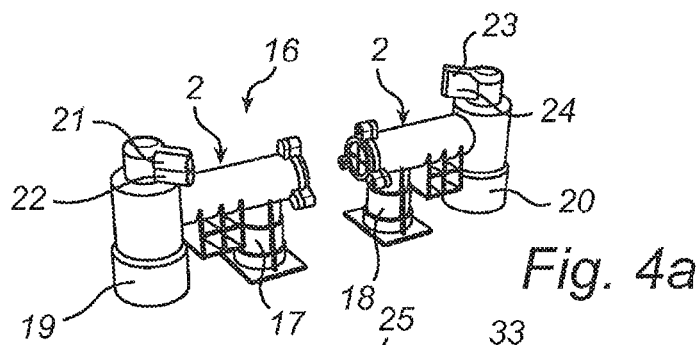
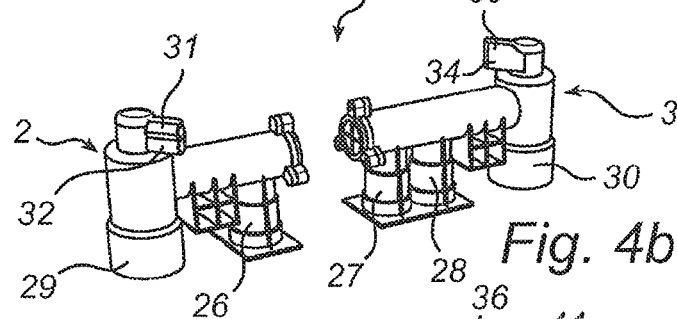
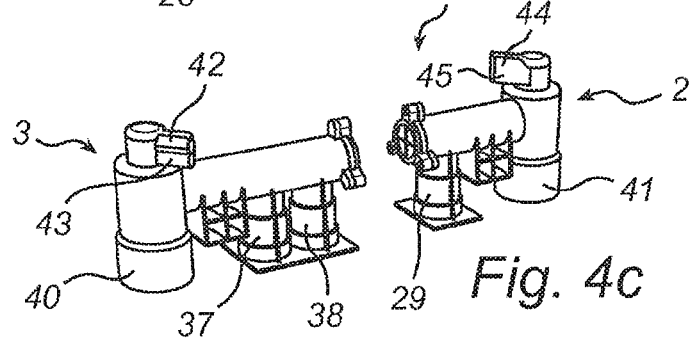
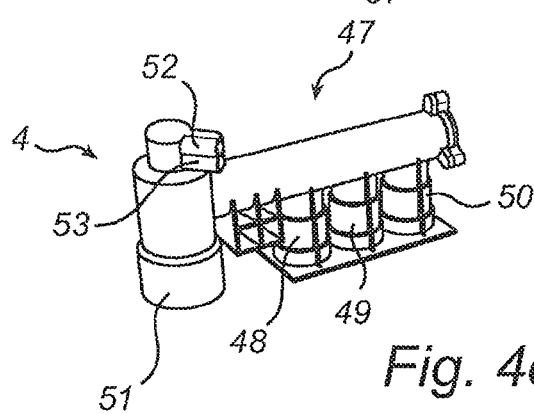
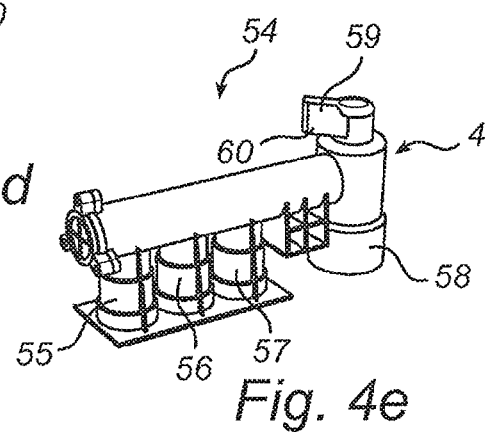
Fig. 4a
Fig. 4b
Fig. 4c
Fig. 4d
Fig. 4e

KIT OF PARTS FOR ASSEMBLING A HOSE CONNECTION, A FUEL DISPENSING UNIT HAVING SUCH A HOSE CONNECTION, AND A METHOD FOR ASSEMBLING SUCH A HOSE CONNECTION

TECHNICAL FIELD

The invention relates to a kit of parts suitable for assembling a hose connection in a fuel dispensing unit for refueling vehicles. The invention also relates to a fuel dispensing unit for refueling vehicles having such a hose connection and a method for assembling such a hose connection.

BACKGROUND ART

A fuel dispensing unit used for filling the fuel tank of a motor vehicle with fuel is a complex device containing a vast number of components connected to each other. The reliability of different components transporting the fuel between an underground reservoir and a fuel tank of the motor vehicle being filled, and the assembly of the same, are of great importance since a leakage in or between any one of these components could be catastrophical.

The hose connection connecting the pipe transporting the fuel from the underground tank with the hose transporting the fuel to the fuel tank of a motor vehicle is such a component.

When filling the fuel tank of a motor vehicle, it is further a common measure to recover the vapour escaping the tank when filling it with liquid fuel. This measure is taken for both safety and environmental reasons. The vapour recovery is achieved, for instance, by arranging a vapour suction nozzle next to the fuel dispensing nozzle of a pistol grip for filling the tank with fuel. Vapour is then removed from the tank during filling, at a certain rate, which is often controlled by the standard rate of at which fuel is dispensed to the tank. Accordingly, since both fuel and potentially fuel vapour travels though the hose connection, the assembly of the components together forming the hose connection is critical.

EP-2,196,717 discloses a hose connection for a fuel dispensing unit. The hose connection comprises a pipe for transporting fuel from a fuel reservoir, a hose for transporting fuel to a motor vehicle, an intermediate member arranged to connect said hose with said pipe, and a locking device fixed to said fuel dispensing unit arranged to interlock said pipe and said intermediate member.

A problem with the above mentioned fuel dispensing unit and other prior art is that the hose connections generally comprise many different components which make the assembly of each hose connection stressing and time consuming for the mechanic performing the operation. The amount of components is increased even further with fuel dispensing units having a plurality of fuel hoses, since a hose connection is needed for each transition between a fuel pipe and a fuel hose in the fuel dispensing unit, respectively.

Further, when several fuel hoses and accordingly several hose connections are provided within the same fuel dispensing unit it is a problem that the assembly of the vapour recovery piping becomes even more complicated and time consuming. In this case, the vapour recovery pipes from all hose connections of each side of the fuel dispensing unit are connected together using several T-joints. This is done, since the common solution is to only use only one vacuum source for all the vapour recovery pipes of each side of the fuel dispensing unit.

Another difficulty with the hose connections available on the market today is that no blending of fuels with varying octane ratings within the hose connection is possible.

SUMMARY OF THE INVENTION

It is an object of the present invention to provide an improvement of the prior art. More particularly, it is an object of the present invention to decrease the number of components in a fuel dispensing unit and to simplify the assembling of the same.

These and other objects as well as advantages that will be apparent from the following description of the present invention are achieved by a kit of parts for assembling a hose connection, a fuel dispensing unit having such a hose connection, and a method for assembling such a hose connection according to the claims below.

Thus, the present invention provides a kit of parts for a fuel dispensing unit, said kit comprising a plurality of hose connection parts selectable from first hose connection parts comprising one fluid inlet and one fluid outlet, second hose connection parts comprising two fluid inlets and one fluid outlet, and third hose connection parts comprising three fluid inlets and one fluid outlet, which kit of parts is suitable for assembling a hose connection having at least a first and second fluid inlet and a first fluid outlet, according to any one of following five configurations:

a first part selected from the first hose connection parts is arranged such that said first fluid inlet is in fluid communication with said first fluid outlet, and a second part selected from the first hose connection parts is arranged such that said second fluid inlet is in fluid communication with a second fluid outlet;

a first part selected from the first hose connection parts is arranged such that said first fluid inlet is in fluid communication with said first fluid outlet, and a second part selected from the second hose connection parts is arranged such that said second fluid inlet and a third fluid inlet is in fluid communication with a second fluid outlet;

a first part selected from the second hose connection parts is arranged such that said first fluid inlet and said second fluid inlet are in fluid communication with said first fluid outlet, and a second part selected from the first hose connection parts is arranged such that a third fluid inlet is in fluid communication with a second fluid outlet;

a first part selected from the third hose connection parts is arranged such that said first, second and a third fluid inlet are in fluid communication with said first fluid outlet;

a first part selected from the third hose connection parts is arranged such that said first, second and a third fluid inlet are in fluid communication with a second fluid outlet.

This is advantageous in that a number of different hose connections for a fuel dispensing unit may be assembled by said kit of parts. By combining the different hose connection parts when assembling the hose connection, it may be varied in order to conform to the fuel dispensing unit in which the hose connection is to be arranged. Since a small number of hose connection parts are used for several different types of hose connections, the overall number of components for a company manufacturing fuel dispensing units carrying the hose connections is reduced. Another advantage is the possibility to blend different types of fuels with varying octane ratings within the hose connection merely by combining the hose connection parts in the different configurations.

The kit of parts may be arranged to be mounted on a support surface of the fuel dispensing unit. Accordingly, the weight of the hose connection will be received by the support surface.

The fluid inlets may be arranged to receive a pipe for transporting fuel, and the fluid outlets may be arranged to receive a hose for transporting fuel. Hence, the hose connection is a solid connection part between the pipe and the hose transporting fuel to e.g. the vehicle to be refueled.

The pipe for transporting fuel may extend in a substantially vertical direction, perpendicular to a surface on which the fuel dispensing unit is placed.

The first, second and third hose connection parts may further comprise at least one vapour recovery port, said at least one vapour recovery port being arranged to receive a vapour recovery pipe. The vapour recovery is then achieved, for instance, by arranging a vapour suction nozzle next to the fuel dispensing nozzle of a pistol grip for filling the tank with fuel. Further, the recovered fuel vapour may be transported through a coaxial hose, via the vapour recovery pipe in the hose connection to the underground reservoir. This measure is taken for both safety and environmental reasons.

The pipe for transporting fuel as well as the vapour recovery pipe may be provided with two annular beads which accommodate an O-ring between themselves. This is advantageous in that a reliable sealing between the vapour recovery pipe and the hose connection parts is achieved.

The kit of parts may be arranged to be mounted in an upper portion of a fuel dispensing unit, thereby creating more free space within the actual housing of the fuel dispensing unit.

According to a second aspect of the invention, the invention relates to a fuel dispensing unit comprising a hose connection assembled with a kit of parts according to the above described features.

According to a third aspect of the invention, the invention relates to a method for assembling a hose connection using a kit of parts according to the above described features.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 4a is a perspective view of a hose connection assembled using the kit of parts shown in FIG. 1 according to a first embodiment of the invention, FIG. 4b is a perspective view of a hose connection assembled using the kit of parts shown in FIG. 1 according to a second embodiment of the invention, FIG. 4c is a perspective view of a hose connection assembled using the kit of parts shown in FIG. 1 according to a third embodiment of the invention, FIG. 4d is a perspective view of a hose connection assembled using the kit of parts shown in FIG. 1 according to a fourth embodiment of the invention, FIG. 4e is a perspective view of a hose connection assembled using the kit of parts shown in FIG. 1 according to a fifth embodiment of the invention.

DETAILED DESCRIPTION OF PREFERRED EMBODIMENTS OF THE INVENTION

Figure 1:
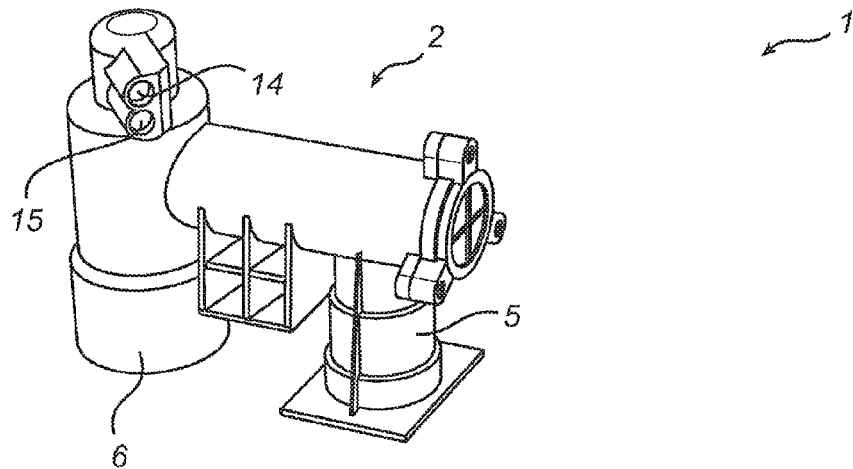
FIGS. 1-3 are perspective views hose connection parts comprised by a kit of parts suitable for assembling a hose connection.
Figure 2:
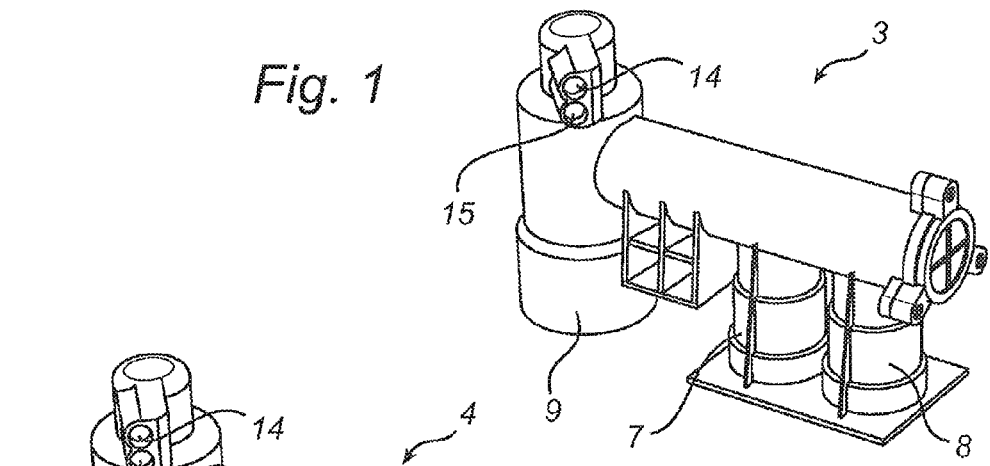
Figure 3:
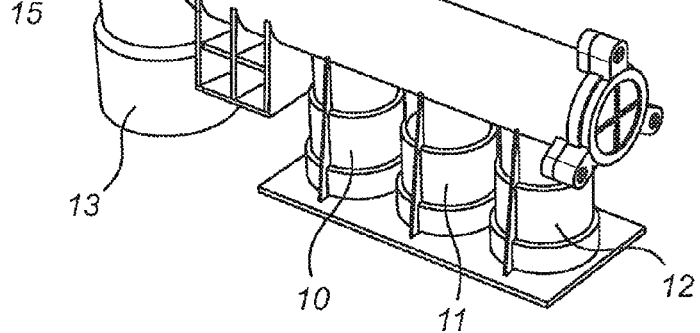

FIGS. 1-3 illustrate a kit of parts 1 for assembling a hose connection for a fuel dispensing unit. The kit of parts 1 comprises first, second and third hose connection parts 2, 3, 4. The first connection parts 2 have one fluid inlet 5 and one fluid outlet 6, the second connection parts 3 have two fluid inlets 7, 8 and one fluid outlet 9, and the third hose connection parts 4 have three fluid inlets 10, 11, 12 and one fluid outlet 13. The fluid inlets 5, 7, 8, 10, 11, 12 are each arranged to receive a pipe for transporting fuel, and the fluid outlets 6, 9, 13 are each arranged to receive a hose for transporting fuel. The hose connection parts 2, 3, 4 have two vapour recovery ports 14, 15, each port 14, 15 being arranged to receive a vapour recovery pipe for transporting fuel vapour. Since each one of the hose connection parts 2, 3, 4 has vapour recovery ports 14, 15, the hose connection is automatically presented with the possibility to recover fuel vapour.

In FIG. 4a, a hose connection 16 assembled using the kit of parts 1 according to a first embodiment of the invention is illustrated. The hose connection 16 has a first and second fluid inlet 17, 18 and a first and second fluid outlet 19, 20. A first part selected from the first hose connection parts 2 is arranged such that the first fluid inlet 17 is in fluid communication with the first fluid outlet 19, and a second part selected from the first hose connection parts 2 is arranged such that the second fluid inlet 18 is in fluid communication with the second fluid outlet 20. Additionally, the hose connection 16 has four vapour recovery ports 21, 22, 23, 24. The fluid inlets 17, 18 are arranged to receive a pipe for transporting fuel, the fluid outlets 19, 20 are arranged to receive a hose for transporting fuel, and the vapour recovery ports 21, 22, 23, 24 are arranged to receive a vapour recovery pipe for transporting fuel vapour.

FIG. 4b illustrates a hose connection 25 assembled using the kit of parts 1 according to a second embodiment of the invention. The hose connection 25 has a first, second and third fluid inlet 26, 27, 28 and a first and second fluid outlet 29, 30. A first part selected from the first hose connection parts 2 is arranged such that the first fluid inlet 26 is in fluid communication with the first fluid outlet 29, and a second part selected from the second hose connection parts 3 is arranged such that the second fluid inlet 27 and the third fluid inlet 28 is in fluid communication with a second fluid outlet 30. Additionally, the hose connection 25 has four vapour recovery ports 31, 32, 33, 34. The fluid inlets 26, 27, 28 are arranged to receive a pipe for transporting fuel, the fluid outlets 29, 30 are arranged to receive a hose for transporting fuel, and the vapour recovery ports 31, 32, 33, 34 are arranged to receive a vapour recovery pipe for transporting fuel vapour.

In FIG. 4c, a hose connection 36 assembled using the kit of parts 1 according to a third embodiment of the invention is illustrated. The hose connection 36 has a first, second and third fluid inlet 37, 38, 39 and a first and second fluid outlet

40, 41. A first part selected from the second hose connection parts 3 is arranged such that the first fluid inlet 37 and the second fluid inlet 38 are in fluid communication with the first fluid outlet 40, and a second part selected from the first hose connection parts 2 is arranged such that the third fluid inlet 39 is in fluid communication with a second fluid outlet 41. Additionally, the hose connection 36 has four vapour recovery ports 42, 43, 44, 45. The fluid inlets 37, 38, 39 are arranged to receive a pipe for transporting fuel, the fluid outlets 40, 41 are arranged to receive a hose for transporting fuel, and the vapour recovery ports 42, 43, 44, 45 are arranged to receive a vapour recovery pipe for transporting fuel vapour.

FIG. 4d illustrates a hose connection 47 assembled using the kit of parts 1 according to a fourth embodiment of the invention. The hose connection 47 has a first, second and third fluid inlet 48, 49, 50 and a first fluid outlet 51. A first part selected from the third hose connection parts 4 is arranged such that the first, second third fluid inlets 48, 49, 50 are in fluid communication with the first fluid outlet 51. Additionally, the hose connection 47 has two vapour recovery ports 52, 53. The fluid inlets 48, 49, 50 are arranged to receive a pipe for transporting fuel, the fluid outlet 51 is arranged to receive a hose for transporting fuel, and the vapour recovery ports 52, 53 are arranged to receive a vapour recovery pipe for transporting fuel vapour.

In FIG. 4e, a hose connection 54 assembled using the kit of parts 1 according to a fifth embodiment of the invention is illustrated. The hose connection 54 has a first, second and third fluid inlet 55, 56, 57 and a second fluid outlet 58. A first part selected from the third hose connection parts 4 is arranged such that the first, second third fluid inlets 55, 56, 57 are in fluid communication with the second fluid outlet 58. Additionally, the hose connection 54 has two vapour recovery ports 59, 60. The fluid inlets 55, 56, 57 are arranged to receive a pipe for transporting fuel, the fluid outlet 58 is arranged to receive a hose for transporting fuel, and the vapour recovery ports 59, 60 are arranged to receive a vapour recovery pipe for transporting fuel vapour.

In a fuel dispensing unit having a plurality of hose connections assembled using the kit of parts 1 of the present invention, and equipped with vapour recovery ports as described above, the hose connections act as an interconnection part for a vapour recovery arrangement of the fuel dispensing unit. The fuel vapour can travel between the hose connections through pipes attached to the vapour recovery ports provided in each hose connection. Accordingly, the vapour recovery pipes from all hose connections of each side of the fuel dispensing unit are connected together using several T-joints. This is done, since the common solution is to only use only one vacuum source for all the vapour recovery pipes of each side of the fuel dispensing unit.

A fuel dispensing unit according to the present invention generally has four hose connections, two on each side of the fuel dispensing unit. Each hose connection connects a tube arrangement with at least one hose. As mentioned above, the tube arrangements and hoses are used for transporting fuel from an underground fuel reservoir to nozzles for refueling e.g. a motor vehicle. The tube arrangements extend from the underground fuel reservoir to an upper portion of the fuel dispensing unit. In the upper portion of the fuel dispensing unit, the tube arrangements are connected to the hoses by means of the hose connections. The tube arrangements are enclosed by compartments and columns of the fuel dispensing unit, and comprise one or several pipes which are attached to the inlets of the hose connections. The hoses are connected the outlets of the hose connections. The hoses extend from the hose connection in the upper portion of the fuel dispensing unit to a respective nozzle arranged in a nozzle boot placed on the side of the fuel dispensing unit.

The number of hose connections in a fuel dispensing unit varies in regard to the amount of hoses to be provided by the fuel dispensing unit. One hose connection is adapted to connect each tube arrangement, consisting of two or three pipes, with one or two hoses. The configuration of the hose connections is adapted to the type of tube arrangements used in the fuel dispensing unit, i.e. the number of pipes of the tube arrangement, together with the number of hoses provided by the fuel dispensing unit.

Figure 5:
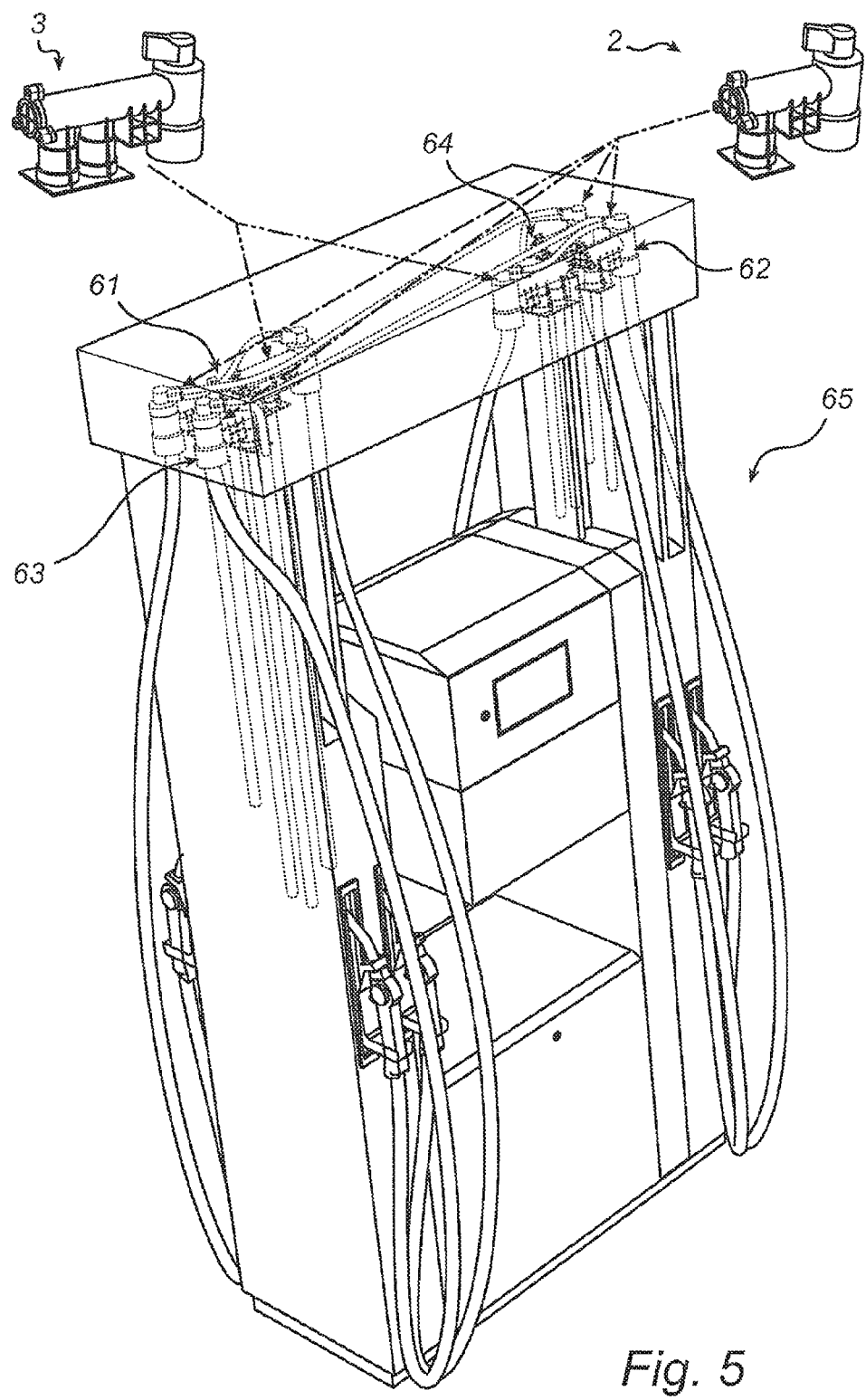
FIG. 5 is a perspective view of a fuel dispensing unit comprising hose connections assembled using the kit of parts illustrated in FIGS. 1-3.

In the embodiment illustrated in FIG. 5, four hose connections 61, 62, 63, 64 are used, two of which are assembled using the kit of parts 1. These two hose connections 61, 62 are assembled with a first hose connection part 2 and a second hose connection part 3, respectively. The other two hose connections are constituted by only a first hose connection part 2, respectively. Accordingly, the hose connections may also be constituted by only a first hose connection part 2 or a second hose connection part 3 of the kit of parts 1 according to the invention. Also, a fuel dispensing unit 65 according to the second aspect of the invention may be equipped with any combination of hose connections described above.

In the second and third hose connection parts 3, 4, blending of fuels with varying octane ratings within the hose connection parts 3, 4 is possible.

In the second hose connection part 3, blending of two different fuels with varying octane ratings is possible within the hose connection part 3. The two fuel types enter the hose connection part 3 through the fluid inlets 7, 8 and are blended within the hose connection part 3. The blended fuel is then ready for extraction through the fluid outlet 9 of the hose connection part 3.

In the third hose connection part 4, blending of three different fuels with varying octane ratings is possible within the hose connection part 4. The three fuel types enter the hose connection part 4 through the fluid inlets 10, 11, 12 and are mixed within the hose connection part 4. The blended fuel is then ready for extraction through the fluid outlet 13 of the hose connection part 4.

In one embodiment of the invention, the kit of parts 1 further comprises fastening elements for connecting the hose connections parts of the hose connection to each other. This will result in a reliable interconnection between the hose connection parts.

According to a second aspect of the invention a fuel dispensing unit is provided comprising a hose connection assembled with a kit of parts according to the above described features.

According to a third aspect of the invention a method for assembling a hose connection is provided using a kit of parts according to the above described features.

The invention has mainly been described above with reference to a few embodiments. However, as is readily appreciated by a person skilled in the art, other embodiments than the ones disclosed above are equally possible within the scope of the inventions, as defined by the appended claims.

The invention claimed is:
1. A kit of parts for a fuel dispensing unit, comprising:
  first hose connection parts comprising a single fuel inlet and a single fuel outlet, the single fuel inlet and the single fuel outlet of the first hose connection parts each have openings facing a first direction, and a first fluid pathway extending between the single fuel inlet and the single fuel outlet of the first hose connection parts that extends transversely to the openings;

second hose connection parts comprising only two fuel inlets and a single fuel outlet, the two fuel inlets and the single fuel outlet of the second hose connection parts each have openings facing the first direction, and a second fluid pathway extending between the two fuel inlets and the single fuel outlet of the second hose connection parts that extends transversely to the openings; and third hose connection parts comprising only three fuel inlets and a single fuel outlet, the three fuel inlets and the single fuel outlet of the third hose connection parts each have openings facing the first direction, and a third fluid pathway extending between the three fuel inlets and the single fuel outlet of the third hose connection parts that extends transversely to the openings;

wherein the kit of parts is configured to assemble a hose connection having at least first and second fuel inlets and a first fuel outlet, according to any one of the following five configurations:

a first part selected from the first hose connection parts is arranged such that said first fuel inlet is in fluid communication with said first fuel outlet, and a second part selected from the first hose connection parts is arranged such that said second fuel inlet is in fluid communication with a second fuel outlet;

a first part selected from the first hose connection parts is arranged such that said first fuel inlet is in fluid communication with said first fuel outlet, and a second part selected from the second hose connection parts is arranged such that said second fuel inlet and a third fuel inlet is in fluid communication with a second fuel outlet;

a first part selected from the second hose connection parts is arranged such that said first fuel inlet and said second fuel inlet are in fluid communication with said first fuel outlet, and a second part selected from the first hose connection parts is arranged such that a third fuel inlet is in fluid communication with a second fuel outlet;

a first part selected from the third hose connection parts is arranged such that said first, second and a third fuel inlet are in fluid communication with said first fuel outlet; and a first part selected from the third hose connection parts is arranged such that said first, second and a third fuel inlet are in fluid communication with a second fuel outlet; and wherein each of the said first, second and third hose connection parts further comprises at least one vapor recovery port, said at least one vapor recovery port being arranged to receive a vapor recovery pipe.

2. The kit of parts according to claim 1, wherein said kit of parts is arranged to be mounted on a support surface of the fuel dispensing unit.

3. The kit of parts according to claim 1, wherein each of the said fuel inlets is arranged to receive a pipe for transporting fuel.

4. The kit of parts according to claim 3, wherein each said pipe extends in a substantially vertical direction, perpendicular to a surface on which the fuel dispensing unit is placed.

5. The kit of parts according to claim 3, wherein said pipe is provided with two annular beads which accommodate an O-ring between themselves.

6. The kit of parts according to claim 1, wherein each of the said fuel outlets is arranged to receive a hose for transporting fuel.

7. The kit of parts according to claim 1, wherein said kit of parts is arranged to be mounted in an upper portion of the fuel dispensing unit.

8. A fuel dispensing unit for filling up motor vehicles, comprising a hose connection assembled with a kit of parts according to claim 1.

9. A method for assembling a hose connection, having at least first and second fuel inlets and first and second fuel outlets, in a fuel dispensing unit, using a kit of parts according to claim 1.

10. The method of claim 9, wherein the first fuel outlet is in fluid communication with a first nozzle of the fuel dispensing unit, and the second fuel outlet is in fluid communication with a second nozzle of the fuel dispensing unit.

11. The method of claim 9, wherein the first and second fuel outlets are not in fluid communication with one another.

12. A method of assembling a fuel dispensing unit, comprising:
  selecting a first part from
    one or more first hose connection parts each including a first fuel inlet and a single fuel outlet in fluid communication with the first fuel inlet such that fuel flowing into the first fuel inlet flows out the single fuel outlet of the first connection part,
    one or more second hose connection parts each including second and third fuel inlets and a single fuel outlet in fluid communication with the second and third fuel inlets such that fuel flowing into the second and third fuel inlets flows out the single fuel outlet of the second hose connection part, and
    one or more third hose connection parts each including fourth, fifth, and sixth fuel inlets and a single fuel outlet in fluid communication with the fourth, fifth, and sixth fuel inlets such that fuel flowing into the fourth, fifth, and sixth fuel inlets flows out the single fuel outlet of the third connection part;
  selecting a second part from the one or more first hose connection parts, the one or more second hose connection parts, and the one or more third hose connection parts;
  connecting the fuel outlet of the selected first part to a first fuel dispensing nozzle such that fuel entering the selected first part flows into the first fuel dispensing nozzle; and
  connecting the fuel outlet of the selected second part to a second fuel dispensing nozzle such that fuel entering the selected second part flows into the second fuel dispensing nozzle;
  wherein the fuel entering the selected first part is prevented from flowing into the second fuel dispensing nozzle, and the fuel entering the selected second part is prevented from flowing into the first fuel dispensing nozzle.

13. The method of claim 12, wherein the selected first part includes one of the second hose connection parts or one of the third hose connection parts such that the selected first part includes a plurality of inlets, the selected first part including a fluid pathway between the plurality of inlets and the single fuel outlet of the selected first part through which fuel entering the plurality of inlets flows so as to blend the fuel entering the plurality of inlets within the fluid pathway prior to the fuel flowing out the single fuel outlet of the selected first part.

14. A kit of parts for a fuel dispensing unit, comprising:
first hose connection parts each having a single fuel inlet and a single fuel outlet in fluid communication with the single fuel inlet; and
a plurality of additional hose connection parts each having a plurality of fuel inlets and a single fuel outlet in communication with each of the plurality of fuel inlets;
wherein the kit of parts is configured to assemble a hose connection according to any one of the following configurations:
   a first part selected from the first hose connection parts, and a second part selected from first hose connection parts;
   a first part selected from the first hose connection parts, and a second part selected from the plurality of additional hose connection parts; and
   a first part selected from the plurality of additional hose connection parts, and a second part selected from the plurality of additional hose connection parts;
wherein each of the said first hose connection parts and plurality of additional hose connection parts further comprises first and second vapor recovery ports arranged to allow interconnecting of all of the first hose connection parts and plurality of additional hose connection parts.

15. The kit of claim 14, wherein the plurality of fuel inlets in each plurality of additional hose connection parts includes two inlets or three inlets.

\* \* \* \* \*